(12) United States Patent
Sekizawa et al.

(10) Patent No.: US 10,858,009 B2
(45) Date of Patent: Dec. 8, 2020

(54) TIRE-MOUNTED SENSOR AND ROAD SURFACE CONDITION ESTIMATION APPARATUS INCLUDING THE SAME

(71) Applicant: DENSO CORPORATION, Kariya (JP)

(72) Inventors: Takatoshi Sekizawa, Kariya (JP); Masashi Mori, Kariya (JP); Ryosuke Kanbayashi, Kariya (JP)

(73) Assignee: DENSO CORPORATION, Kariya (JP)

(*) Notice: Subject to any disclaimer, the term of this patent is extended or adjusted under 35 U.S.C. 154(b) by 150 days.

(21) Appl. No.: 16/243,121

(22) Filed: Jan. 9, 2019

(65) Prior Publication Data

US 2019/0143988 A1 May 16, 2019

Related U.S. Application Data

(63) Continuation of application No. PCT/JP2017/023194, filed on Jun. 23, 2017.

(30) Foreign Application Priority Data

Jul. 13, 2016 (JP) .................................. 2016-138652
Jun. 5, 2017 (JP) .................................. 2017-110683

(51) Int. Cl.
*B60C 19/00* (2006.01)
*B60W 40/06* (2012.01)
(Continued)

(52) U.S. Cl.
CPC ......... *B60W 40/06* (2013.01); *B60C 11/0332* (2013.01); *B60C 19/00* (2013.01);
(Continued)

(58) Field of Classification Search
CPC .. G01M 17/02; G01M 17/021; G01M 17/022; G01M 17/027; G01M 17/025;
(Continued)

(56) References Cited

U.S. PATENT DOCUMENTS

2009/0105921 A1 4/2009 Hanatsuka et al.
2017/0305421 A1 10/2017 Sekizawa et al.
(Continued)

FOREIGN PATENT DOCUMENTS

JP 2016088429 A 5/2016
WO WO-2006135090 A1 12/2006

*Primary Examiner* — Andre J Allen
(74) *Attorney, Agent, or Firm* — Harness, Dickey & Pierce, P.L.C.

(57) ABSTRACT

A tire-mounted sensor is mounted to a rear surface of a tread of a tire. the tire-mounted sensor includes: a vibration detector, a signal processor, a transmitter, and an activation controller. The vibration detector outputs a detection signal according to amplitude of a vibration of the tire. The signal processor extracts a ground contact section during which the portion of the tread provided with the vibration sensor is in contact with the ground, from the detection signal, and generates a road surface data based on the detection signal during the ground contact section. The transmitter transmits the road surface data. The activation controller starts an activation of the signal processor at a time in association with the ground contact starting time at which the portion of the tread provided with the vibration detector begins to be in contact with the ground.

11 Claims, 7 Drawing Sheets

(51) Int. Cl.
*G01H 1/00* (2006.01)
*B60C 11/03* (2006.01)
*B60C 23/06* (2006.01)
*B60T 8/1763* (2006.01)

(52) U.S. Cl.
CPC ............ *B60C 23/06* (2013.01); *B60T 8/1763* (2013.01); *G01H 1/00* (2013.01); *G01H 1/003* (2013.01); *B60C 2019/004* (2013.01); *B60W 2400/00* (2013.01); *B60W 2552/00* (2020.02)

(58) Field of Classification Search
CPC ...... G01M 17/024; G01M 17/10; G01M 7/08; G01M 17/0076; G01M 17/013; G01M 17/03; G01M 17/04; G01M 17/06; G01M 17/08; G01M 1/02; G01M 1/045; G01M 1/12; G01M 1/225; G01M 3/04; G01M 3/40; G01M 5/0091; G01M 7/02; G01M 99/00; G01M 99/002; B60C 23/0494; B60C 2019/004; B60C 23/0493; B60C 23/064; B60C 19/00; B60C 23/04; B60C 23/0488; B60C 23/0498; B60C 23/0496; B60C 23/0408; B60C 23/041; B60C 23/0411; B60C 23/20; B60C 11/246; B60C 23/0486; B60C 23/06; B60C 23/061; B60C 11/243; B60C 99/00; B60C 11/0083; B60C 13/003; B60C 2009/2038; B60C 23/004; B60C 23/02; B60C 23/0401; B60C 23/0406; B60C 23/0416; B60C 23/0433; B60C 23/0455; B60C 23/0459; B60C 23/0474; B60C 23/0489; B60C 23/0491; B60C 25/002; B60C 25/005; B60C 25/007; B60C 29/02; B60C 3/04; B60C 99/006; B60C 11/0332; B60C 11/24; B60C 13/001; B60C 13/02; B60C 15/0036; B60C 17/02; B60C 2009/0071; B60C 2009/2022; B60C 2200/02; B60C 2200/06; B60C 2200/065; B60C 23/00; B60C 23/001; B60C 23/003; B60C 23/007; B60C 23/008; B60C 23/0413; B60C 23/0427; B60C 23/0447; B60C 23/0454; B60C 23/0457; B60C 23/0462; B60C 23/0471; B60C 23/0472; B60C 23/0476; B60C 23/0479; B60C 23/0484; B60C 23/065; B60C 23/066; B60C 23/10; B60C 25/0548; B60C 25/056; B60C 25/132; B60C 25/138; B60C 29/005; B60C 9/005; B60C 9/18; B60C 9/1807; B60C 9/20; B60C 9/28
USPC ................................................. 73/146–146.8
See application file for complete search history.

(56) References Cited

U.S. PATENT DOCUMENTS

| | | | | |
|---|---|---|---|---|
| 2018/0118209 | A1* | 5/2018 | Suzuki | B60T 8/1725 |
| 2018/0222458 | A1* | 8/2018 | Suzuki | B60T 8/1725 |
| 2018/0364197 | A1* | 12/2018 | Suzuki | G01N 29/44 |
| 2019/0143987 | A1* | 5/2019 | Sekizawa | B60W 40/06 |
| | | | | 73/146 |
| 2019/0143988 | A1* | 5/2019 | Sekizawa | B60C 19/00 |
| | | | | 73/146 |
| 2019/0168549 | A1* | 6/2019 | Kanbayashi | G01M 17/02 |
| 2019/0176834 | A1* | 6/2019 | Kanbayashi | B60C 23/064 |
| 2019/0185008 | A1* | 6/2019 | Kanbayashi | G08G 1/16 |
| 2019/0225227 | A1* | 7/2019 | Mori | B60C 19/00 |
| 2020/0208969 | A1* | 7/2020 | Suzuki | B60W 40/06 |

* cited by examiner

TIRE-MOUNTED SENSOR AND ROAD SURFACE CONDITION ESTIMATION APPARATUS INCLUDING THE SAME

CROSS REFERENCE TO RELATED APPLICATIONS

The present application is a continuation application of International Patent Application No. PCT/JP2017/023194 filed on Jun. 23, 2017, which designated the United States and claims the benefit of priority from Japanese Patent Application No. 2016-138652 filed on Jul. 13, 2016 and Japanese Patent Application No. 2017-110683 filed on Jun. 5, 2017. The entire disclosures of all of the above applications are incorporated herein by reference.

TECHNICAL FIELD

The present disclosure relates to a tire-mounted sensor and a road surface condition estimation apparatus including the same.

BACKGROUND

A typical road surface condition detector detects a road surface condition with the use of a tire-mounted sensor attached to, for example, the rear surface of the tread of a tire. The road surface condition detector detects vibration of the tire with a use of an acceleration sensor included in the tire-mounted sensor to detect the road surface condition by analyzing the waveform of the vibration.

SUMMARY

The present disclosure provides a tire-mounted sensor that outputs a detection signal. When the sensor starts to be activated, the sensor extracts a ground contact section, during which the portion of the tread provided with the vibration sensor is in contact with the ground, from the detection signal, and generates a road surface data based on the extracted ground contact section to transmit the road surface data.

BRIEF DESCRIPTION OF DRAWINGS

The above object, the other objects, features, and advantages of the present disclosure will become more apparent from the following detailed description with reference to the accompanying drawings, in which.

DETAILED DESCRIPTION

Figure 1:
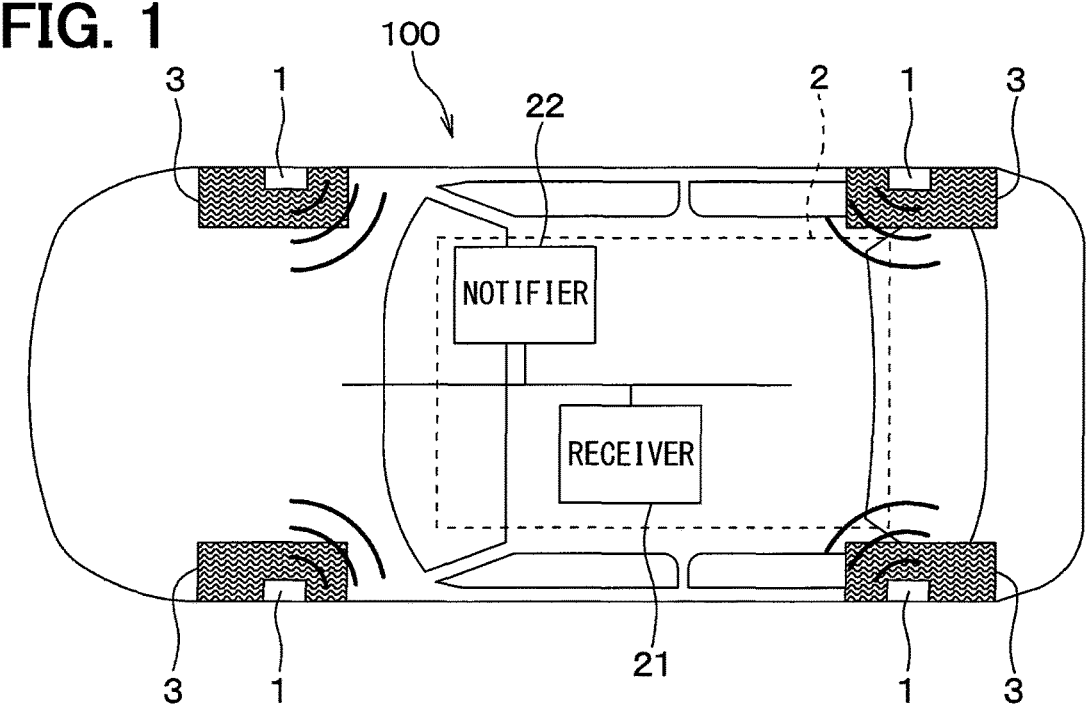
FIG. 1 is a diagram showing an entire block configuration of a road surface condition estimation apparatus according to a first embodiment.

A road surface condition detection apparatus is generally configured to detect a road surface condition by using a tire-mounted sensor mounted on the inner side of a tire, e.g., the rear surface of the tread of the tire. The road surface condition is detected by detecting a vibration transmitted to the tire using an acceleration sensor provided in the tire-mounted sensor and analyzing this vibration waveform.

When a button cell is used as a power source for a tire-mounted sensor, or when a power generation device is used for a tire-mounted sensor, the tire-mounted sensor is required to be driven by a limited power supply such as a button cell in either situation. It is difficult to change a button cell as the tire-mounted sensor is inside the tire. Therefore, it is essential to reduce power consumption. Especially, it is required to reduce power consumption in a signal processor such as a microcomputer, which has large power consumption in the tire-mounted sensor.

According to an aspect of the present disclosure, the tire-mounted sensor is mounted to a rear surface of a tread of a tire. The tire-mounted sensor includes: a vibration detector, a signal processor, a transmitter, and an activation controller. The vibration detector is configured to output a detection signal according to amplitude of a vibration of the tire. The signal processor is configured to extract a ground contact section, which refers to a time period during which the portion of the tread provided with the vibration sensor is in contact with the ground, from the detection signal, and generate a road surface data, which indicates a road surface condition based on the detection signal during the ground contact section. The transmitter is configured to transmit the road surface data. The activation controller is configured to start an activation of the signal processor. Additionally, the activation controller starts the activation of the signal processor at a time, which is in association with a ground contact starting time at which the portion of the tread provided with the vibration detector begins to be in contact with the ground.

As described above, the portion of the tire where the vibration detector is attached controls the signal processor to start activation in association with a ground contact starting time at which the part starts to be in contact with the ground. It is possible to reduce the activation time for the signal processor for reducing power consumption. Accordingly, when a button cell is used as a power supply, it is possible to improve the lifespan of the battery. If a power generation device is used as a power supply, it is possible to obtain adequate power for detecting road surface condition even though the amount of power generated by the power generation device is smaller.

Hereinafter, embodiments of the present disclosure will be described with reference to the drawings. In the following embodiments, the same or equivalent parts are denoted by the same reference numerals.

First Embodiment

A road surface condition estimation apparatus 100 including a tire-mounted sensor 1 according to the present embodiment will be described with reference to FIG. 1 to FIG. 8. The road surface condition estimation apparatus according to the present embodiment is employed to estimate a road surface condition based on a vibration in a contact surface of a tire attached to each of wheels of the vehicle.

Figure 2:
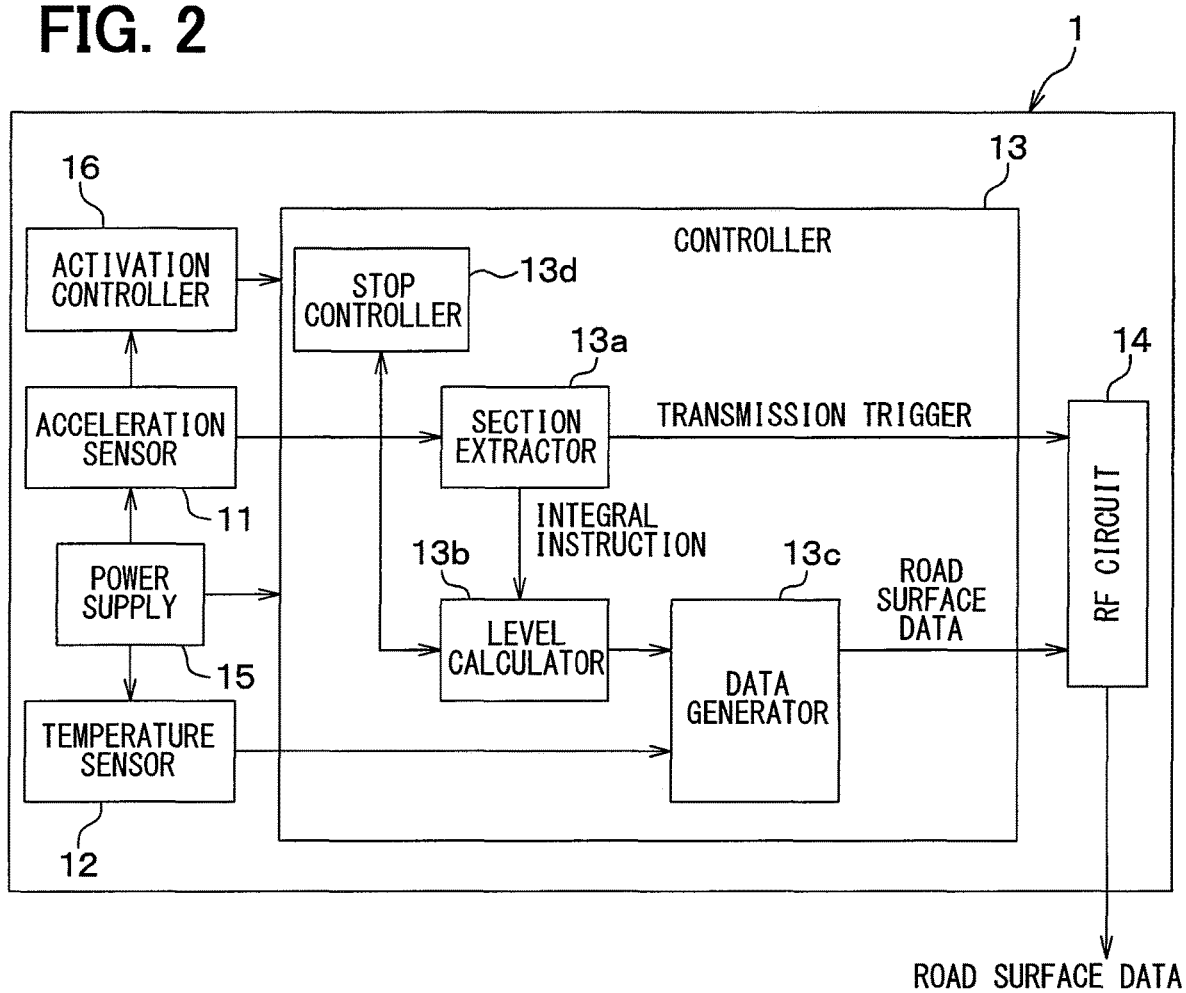
FIG. 2 is a block diagram of the tire-mounted sensor.

As shown in FIG. 1 and FIG. 2, the road surface condition estimation apparatus 100 has a tire-mounted sensor 1 attached to each wheel and a vehicle body system 2 including various devices mounted in a vehicle body. The vehicle body system 2 includes, for example, a transceiver 21 and a notifier 22.

In the road surface condition estimation apparatus 100, the tire-mounted sensor 1 transmits data representing a road surface state during travel, such as data indicating a road surface μ between a tire 3 and the road surface being traveled. Hereinafter, the data of the road surface μ is referred to as μ data and the data representing the road surface condition such as the μ data is referred to as road surface data.

The road surface condition estimation apparatus 100 receives the road surface data transmitted from the tire-mounted sensor 1 by the transceiver 21 and conveys the road surface condition indicated by the road surface data from the notifier 22. It is thus made possible to notify the driver of the road surface condition, for example, that the road surface μ is low, and the road surface is dry, wet or frozen. It is also made possible to warn the driver if the road surface is wet. Specifically, the tire-mounted sensor 1 and the receiver 21 are configured as follows.

Figure 3:
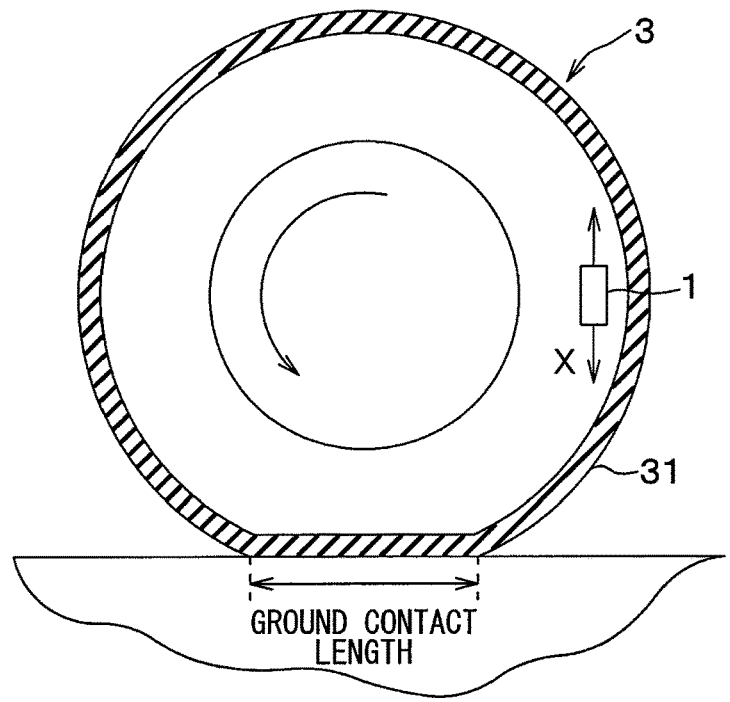
FIG. 3 is a regional schematic view of a tire to which the tire-mounted sensor is attached.

The tire-mounted sensor 1 is a tire-side device provided at a tire side. The tire-mounted sensor 1 is a tire-side device provided at a tire side. As shown in FIG. 2, the tire-mounted sensor 1 includes an acceleration sensor 11, a temperature sensor 12, a controller 13, an RF circuit 14, a power supply 15, and an activation controller 16. As shown in FIG. 3, the tire-mounted sensor 1 is provided at a rear side area of a tread 31 of the tire 3.

The acceleration sensor 11 includes a vibration detector that detects vibration applied to the tire. For example, the acceleration sensor 11 outputs a detection signal of acceleration. The detection signal corresponds to vibration in a direction in contact with a circular orbit drawn by the tire-mounted sensor 1 when the tire 3 rotates. That is, the detection signal corresponds to vibration in a tire tangential direction shown by an arrow X in FIG. 3. For more details, the first acceleration sensor 11 generates as the detection signal an output voltage, which is positive in one direction and negative in the opposite direction, between two directions indicated with the arrow X.

The temperature sensor 12 outputs a detection signal corresponding to the temperature. The temperature sensor 12 measures the temperature of the traveling road surface by detecting the temperature of the position of the tire 3 to which the tire-mounted sensor 1 is attached.

The controller 13 is a signal processor. The controller 13 operates to generate road surface data by using the detection signal of the acceleration sensor 11 as a detection signal, which indicates the vibration data in the tire-tangential direction, and processing this detection signal, and sends the road surface data to the RF circuit 14. Specifically, the controller 13 extracts a ground-contact section of the acceleration sensor 11 during rotation of the tire 3 based on the detection signal of the acceleration sensor 11, that is, a time change of the output voltage of the acceleration sensor 11. The ground contact section refers to a section in which a part of the tread 31 of the tire 3 corresponding to the position of the acceleration sensor 11 is in contact with the road surface. In the present embodiment, the location of arrangement of the acceleration sensor 11 corresponds to the location of arrangement of the tire-mounted sensor 1, so that the ground contact section has the same meaning as a section in which the part of the tread 31 of the tire 3 corresponding to the position of the tire-mounted sensor 1 is in contact with the road surface.

Since high frequency components included in the detection signal of the acceleration sensor 11 generated in a period of the ground contact zone indicate the road surface condition, the controller 13 extracts the high frequency components from the detection signal and detects the road surface condition such as the road surface μ based on the extracted high frequency components. For the road surface condition estimation, it is preferable to perform estimation based on a detection signal of the acceleration sensor 11 during the whole period of the ground contact section. However, the signal over the whole period of the ground contact section may not be necessarily used. The signal covering at least one part of the whole period may also be used. Additionally, in addition to use the detection signal of the acceleration sensor 11 during ground contact, the detection signal at a period before ground contact or a period after ground contact may also be used for road surface condition estimation. The present embodiment describes an example in which the detection signal over the whole period of the ground contact section. However, the detection signal in one part of the whole period of the ground contact section may also be used.

With regard to the present embodiment, the temperature sensor 12 measures the temperature of a traveling road surface. The controller 13 detects a road surface condition based on the temperature of the travelling road surface, and corrects the road surface condition evaluated from high-frequency components of the detection signal of the acceleration sensor 11.

The controller 13, thus detecting the road surface condition, generates the road surface data indicating the road surface condition and executes processing of sending it to the RF circuit 14. As a result, the RF circuit 14 transmits the road surface data to the receiver 21.

The after-mentioned activation controller 16 controls the controller 13 to perform the estimation of road surface condition. However, the controller 13 is configured to stop activation in case of satisfying one or more predetermined conditions since the amount of power consumption is larger when the activation is maintained for estimating the road surface condition.

The controller 13 is provided by a microcomputer including a CPU, a ROM, a RAM, an I/O and the like and executes the processing for detecting the road surface condition based on a program stored in the ROM or the like. The controller 13 includes, as a functional device for executing such processing, a section extractor 13a, a level calculator 13b and a data generator 13c and a stopping controller 13.

Figure 4:
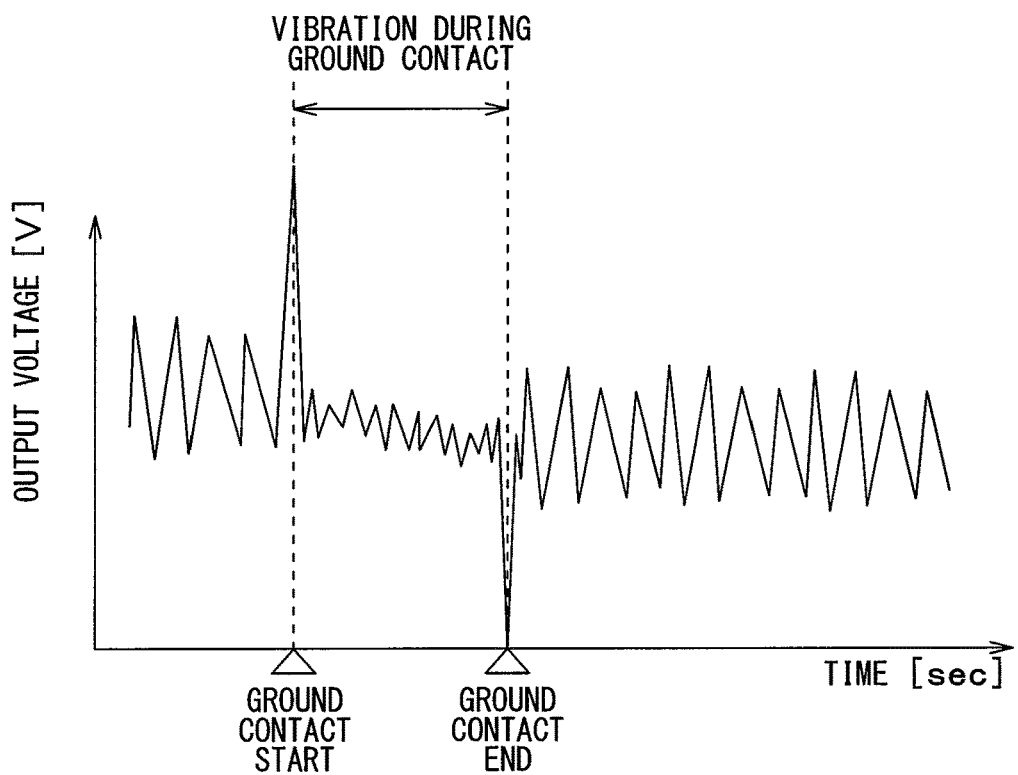
FIG. 4 is a diagram showing an output voltage waveform of an acceleration sensor during tire rotation.

The section extractor 13a extracts the ground contact section by detecting a peak value of the detection signal indicated by the output voltage of the acceleration sensor 11. The ground contact section is extracted during the measurement period, which is informed by the angle detector 13a. For example, the output voltage waveform of the acceleration sensor 11 during the tire rotation is shown in FIG. 4. As shown in FIG. 4, the output voltage of the acceleration sensor 11 has a maximum value at the ground contact starting time when the portion of the tread 31 of the tire 3 corresponding to the position of the acceleration sensor 11 starts to have a contact with the ground with the rotation of the tire 3. The section extractor 13a detects the ground contact starting time, at which the output voltage of the acceleration sensor 11 takes the maximum value, as a first peak value time. As shown in FIG. 4, the output voltage of the acceleration sensor 11 has a minimum value at the ground contact ending time when the portion of the tread 31 of the tire 3 corresponding to the position of the acceleration sensor 11 is changed from a state of having a contact with the ground to a state of not having a contact with the ground with the rotation of the tire 3. The section extractor 13a detects the ground contact ending time, at which the output voltage of the acceleration sensor 11 takes the minimum value, as a second peak value time.

The reason why the output voltage of the acceleration sensor 11 has peak values at the above time is described in the following section. When the portion of the tread 31 corresponding to the position of the acceleration sensor 11 is in contact with the ground with the rotation of the tire 3, a portion of the tire 3, which had a substantially cylindrical surface, is pressed to be deformed into a flat shape in the vicinity of the acceleration sensor 11. Upon receiving the impact at this time, the output voltage of the acceleration sensor 11 has the first peak value. When the portion of the tread 31 corresponding to the position of the acceleration sensor 11 is separated from the ground with the rotation of the tire 3, the pressing of the portion of the tire 3 is released in the vicinity of the acceleration sensor 11, and the flat shape of the portion of the tire 3 returns to the substantially cylindrical shape. Upon receiving the impact when the shape of the tire 3 returns to the original shape, the output voltage of the acceleration sensor 11 has the second peak value. In this way, the output voltage of the acceleration sensor 11 has the first peak value and the second peak value at the ground contact starting time and the ground contact ending time, respectively. Since a direction of impact when the tire 3 is pressed and a direction of impact when the tire 3 is released from pressurization are opposite, polarities of the output voltages are also opposite.

The section extractor 13a extracts the ground contact section of the acceleration sensor 11 by extracting the data of the detection signal including the times of the first peak value and the second peak value and sends the data that it is within the ground contact section to the level calculator 13b.

Since the output voltage of the acceleration sensor 11 takes the second peak value at the ground contact ending time of the acceleration sensor 11, the section extractor 13a transmits a detection signal to the RF circuit 14 at this time. As a result, the RF circuit 14 transmits the road surface data such as the μ data generated by the data generator 13c as described later. Accordingly, since the data transmission by the RF circuit 14 is not always performed, but only at the ground contact ending time of the acceleration sensor 11, the power consumption can be reduced. Although the time at which the output voltage of the acceleration sensor 11 takes the second peak value is exemplified to be the data transmission time from the RF circuit 14, the data transmission time may be other times. Further, instead of performing data transmission once every rotation of the tire 3, the data may be transmitted once every plural rotations or plural times per rotation.

When it is sent from the section extractor 13a that it is within the ground contact section, the level calculator 13b calculates a level of the high frequency components, which arise from vibrations of the tire 3 and is included in the output voltage of the acceleration sensor 11 during the interval of the ground contact section. The level calculator 13b sends such a calculation result to the data generator 13c as the road surface data such as the μ data. The level of the high frequency components is calculated as an index indicating the road surface state such as the road surface μ for the following reasons described below with reference to FIG. 5A, FIG. 5B and FIG. 6.

Figure 5A:
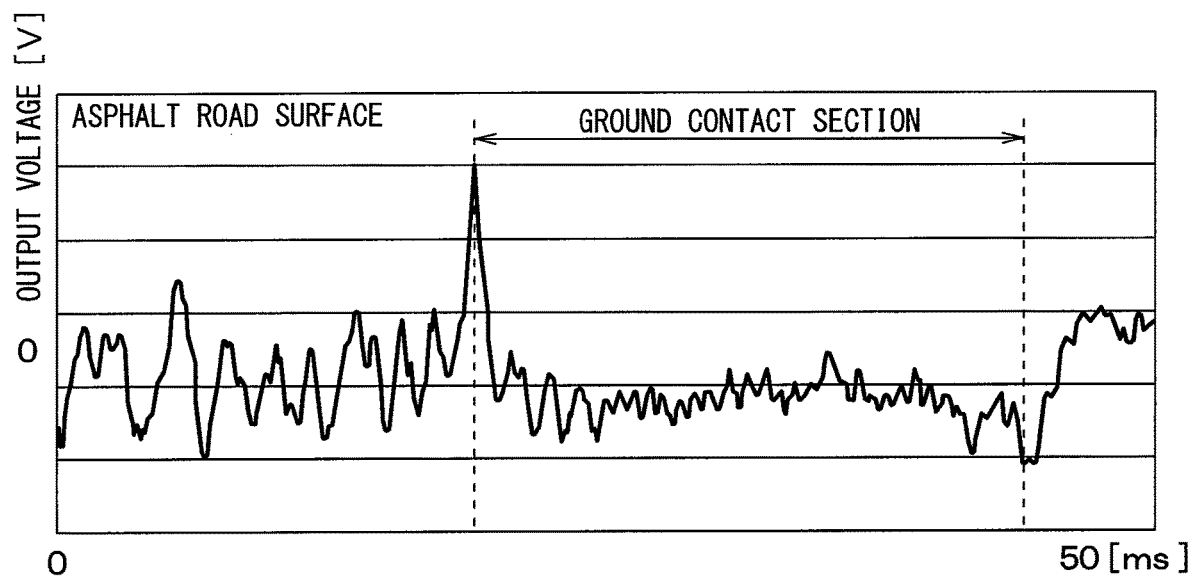
FIG. 5A is a chart showing a change in an output voltage of the acceleration sensor in case of traveling on a high μ road surface such as an asphalt road, a road surface μ of which is comparatively higher.
Figure 5B:
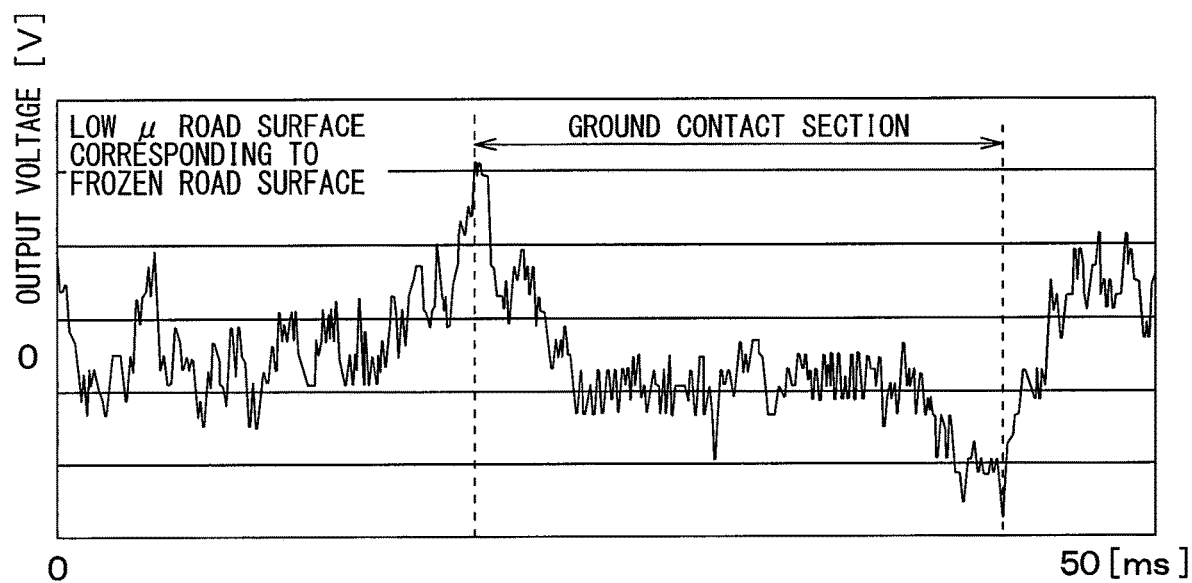
FIG. 5B is a chart showing a change in the output voltage of the acceleration sensor in case of traveling on a low μ road surface such as a frozen road, a road surface μ of which is comparatively lower.

FIG. 5A shows a change of the output voltage of the acceleration sensor 11 in case of traveling on the high μ road surface like an asphalt road, the road surface μ of which is comparatively large. FIG. 5B shows a change of the output voltage of the acceleration sensor 11 in case of traveling on the low μ road surface like a road corresponding to a frozen road, the road surface μ of which is comparatively small.

As is evident from those figures, the first peak value and the second peak value appear at the start and the end of the ground contact section, that is, the ground contact starting time and the ground contact ending time of the acceleration sensor 11, respectively, regardless of the road surface μ. However, the output voltage of the acceleration sensor 11 changes as affected by the road surface μ. For example, in case that the road surface μ is lower like traveling on the low μ road surface, fine high frequency vibrations caused by slipping of the tire 3 are superimposed on the output voltage. This fine high frequency noise caused by slipping of the tire 3 is not superimposed so much in case that the road surface μ is higher like traveling on the higher μ road surface.

Figure 6:
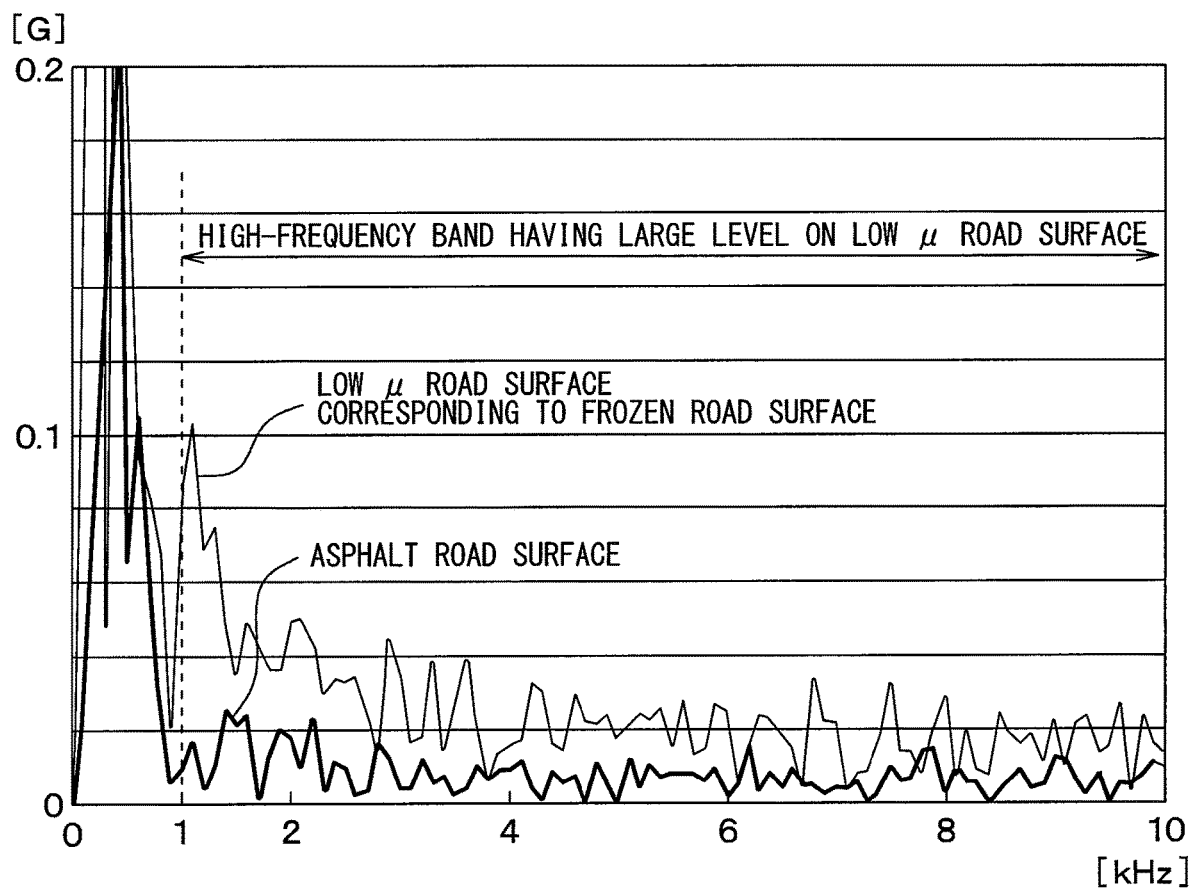
FIG. 6 is a diagram showing a result of frequency analysis performed on the output voltage during a contact section with respect to each case of traveling on the high μ road and the low μ road.
Figure 7:
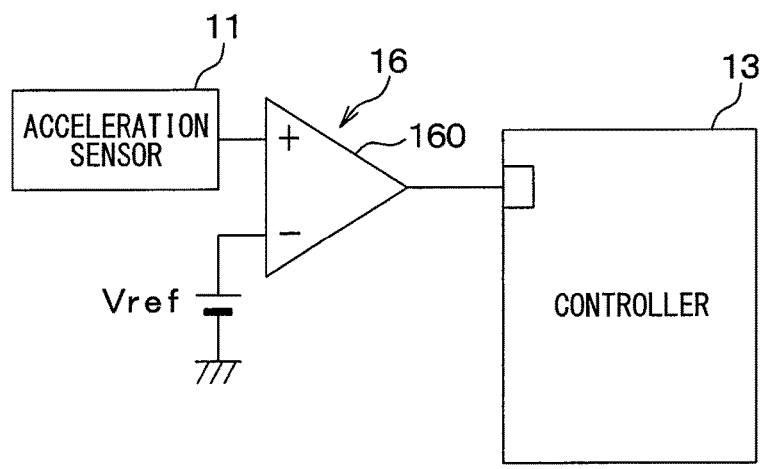
FIG. 7 is a drawing that illustrates the particular configuration of an activation controller.

For this reason, frequency analysis of the output voltage in the ground contact section with respect to the higher road surface μ and lower road surface μ produces results shown in FIG. 6. That is, in a low frequency band, the level is high regardless of traveling on the high μ road or on the low μ road. However, in a high frequency band of 1 kHz or more, the level is higher in case of the low road surface μ than in case of the high road surface μ. For this reason, the level of the high frequency components of the output voltage of the acceleration sensor 11 is the index indicating the road surface condition.

Therefore, by calculating the level of the high frequency components of the output voltage of the acceleration sensor 11 in the ground contact section by the level calculator 13b, it is possible to use the calculated level as the μ data. Further, it is possible to detect a type of the road surface corresponding to the road surface μ as the road surface condition. For example, it is possible to determine the frozen road when the road surface μ is low.

For example, the high frequency component level is calculated as an integrated voltage value by extracting the high frequency components from the output voltage of the acceleration sensor 12 and integrating the high frequency components extracted during the interval of the ground contact zone. Specifically, the high frequency components of the frequency band fa to fb, in which it is assumed to change in correspondence to the road surface condition or the road surface μ, are extracted by filtering or the like and a voltage of the high frequency components in the frequency band fa to fb extracted by the frequency analysis is integrated to acquire the integrated voltage value. For example, the integrated voltage value is acquired by charging a capacitor (not shown). Thus the charge amount is greater in case that the road surface μ is low like traveling on the low μ road surface than in case that the road surface μ is high like traveling on the high μ road surface. By thus using the charge amount as the μ data, it is possible to estimate the road surface μ is lower as the charge amount indicated by the μ data is greater.

The data generator 13c basically generates the road surface data based on the calculation result of the level calculator 13d. For example, the data generator 13c uses the μ data as it is as the road surface data or generates data as the road surface data by determining the road surface condition like the frozen road or the asphalt road based on the μ data.

Further, as described above, in the present embodiment, the temperature of the traveling road surface is measured by the temperature sensor 12. The data generator 13c acquires a road surface temperature by receiving an input of the detection signal of the temperature sensor 12, and detects the type of road surface based on the acquired road surface temperature, and performs the correction of μ data or the correction of the type of road surface based on the acquired μ data.

For example, when the road surface temperature detected by the temperature sensor 12 is lower than 0° C., the data generator 13c detects that the road surface is in a frozen condition as the type of road surface. Furthermore, when μ data evaluated from the high frequency components of the detection signal of the acceleration sensor 11 or the type of road surface indicated by the μ data does not correspond to the road surface temperature detected by the temperature sensor 12, the data generator 13c corrects the data and does not adopt this data as the detection result of road surface condition. For example, when the type of road surface evaluated from the high frequency components of the detection signal of the acceleration sensor 11 is in a frozen state while the temperature sensor 12 detects the road surface temperature at 40° C., it is considered that there is an error in the detection result for determining the type of road surface in a frozen state. In this situation, the data generator 13c does not adopt the result sent from the level calculator 13b as a detection result for determining the type of road surface. Similarly, when the road surface μ indicated by the μ data does not correspond to the type of road surface based on the road surface temperature, the road surface μ indicated by the μ data is corrected to a value lower than the value before correction when the road surface μ indicated by the μ data is high in a situation where the frozen state is detected based on the road surface temperature.

A stop controller 13d refers to a part for stopping activation of the controller 13. As mentioned hereinafter, the activation controller 16 controls the controller 13 to start activation. The stop controller 13d stops the activated controller 13 when one or more predetermined conditions are satisfied.

In particular, when the output voltage of the acceleration sensor 11 is smaller than or equal to a stopping threshold value, the stop controller 13d stops the activated controller 13. The predetermined stopping threshold value refers to a threshold value for detecting the ground contact ending time, in other words, detecting the second peak value. When the output voltage of the acceleration sensor 11 is smaller than or equal to the predetermined stopping threshold value, it is at the time where the second peak value is detected. As described above, with regard to the present embodiment, the part of the detection signal of the acceleration sensor 11 used for estimating the road surface condition is between the first peak value and the second peak value. In other words, with regard to the detection signal of the acceleration sensor 11, the time after detecting the second peak value is not used for estimating the road surface condition.

Before the output voltage of the acceleration sensor 11 is equal to or smaller than the predetermined threshold value, the activation of the controller 13 is maintained for estimating the road surface condition based on the detection signal of the acceleration sensor 11. The activation of the controller 13 is stopped when the output voltage of the acceleration sensor 11 is smaller than or equal to the predetermined stopping threshold value.

The RF circuit 14 includes a transmitter, which transmits to the transceiver 21 the road surface data such as the μ data sent from the data generator 13c. Communication between the RF circuit 14 and the receiver 21 can be implemented by a short-distance wireless communication technology such as Bluetooth (registered trademark), for example. Although the time of transmitting the road surface data is arbitrary. In the present embodiment, as described above, when the transmission trigger is sent from the section extractor 13a at the ground contact ending time of the acceleration sensor 11, the road state data is transmitted from the RF circuit 14. Accordingly, since the data transmission by the RF circuit 14 is not always performed, but only at the ground contact ending time of the acceleration sensor 11, the power consumption can be reduced.

The road surface data is transmitted together with the individual identification information (hereinafter referred to as ID information) of each wheel which is provided in advance for each tire 3 of the vehicle. The position of each wheel can be identified by a wheel position detecting device that detects where the wheel is mounted on the vehicle. By transmitting the road surface data together with the ID information to the transceiver 21, it is possible to determine the wheel to which the road surface state data corresponds.

The power supply 15 is formed of a battery, for example, and supplies power to drive each component of the tire-mounted sensor 1.

The activation controller 16 controls the activation of the controller 13. The activation controller 16 is activated to restrict the operation of the controller so as to suppress power consumption of the power supply 15. For the controller 13 to estimate the road surface condition, it is required for the controller 13 to be activated in the ground contact section, which is between the start of ground contact and the end of ground contact. In other words, it is required for the controller 13 to be activated in a period from a moment where the first peak value of the output voltage of the acceleration sensor 11 is detected and a moment where the second peak value of the output voltage of the acceleration sensor 11 is detected. The activation controller 16 detects the time at the start of ground contact, in other words, the time where the output voltage of the acceleration sensor 11 is at the first peak value. The activation controller 16 uses, for example, this time to start activating the controller 13. In the present embodiment, the activation controller 16 is configured by the circuit shown in FIG. 7.

In particular, the activation controller 16 includes a comparator 160 for comparing a value of the output voltage of the acceleration sensor 11 with a value of the reference voltage Vref. When the output voltage of the acceleration sensor 11 is applied to the comparator 160, the output level of the comparator 160 is changed from a low level to a high level in a situation where the output voltage of the acceleration sensor 11 is larger than or equal to the reference voltage Vref as the predetermined starting threshold. The output of the comparator 160 which is changed to the high level is sent to a port of the controller 13. Thus, the controller 13 is activated. The controller 13 is activated based on power supply from the power supply 15. The controller 13 is configured to estimate the road surface condition based on the output voltage of the acceleration sensor 11. For stopping the activation of the controller 13, it is executed by the above-mentioned stopping controller 13d but not the activation controller 16. The activation of the controller 13 is stopped at the time where the output voltage of the acceleration sensor 11 is at the second peak value.

The transceiver 21 receives the road surface data transmitted from the tire-mounted sensor 1, estimates the road surface condition based on the received road surface data, sends the estimated road surface condition to the notifier 22 and notifies of, if necessary, the road surface condition to a driver from the notifier 22. Thus, the driver tries to drive the vehicle in a manner matching the road surface condition and is possible to avoid potential danger to the vehicle. For example, the estimated road surface state may be displayed always by the notifier 22 or the road surface condition may be displayed to warn the driver only when the vehicle need be driven more carefully than usual, for example, when the estimated road surface condition corresponds to the low μ road like the wet road or the frozen road. Further, by transmitting the road surface condition to an electronic control unit (hereinafter referred to as ECU) for vehicle motion control, for example, ECU for brake control, from the transceiver 21, the vehicle motion control can be attained based on the transmitted road surface condition.

The notifier 22 is configured with a meter display device for example and used to notify the driver of the road surface state. In case that the notifier 22 is configured with the meter display device, it is located at a position which the driver is capable of recognition during driving of the vehicle, for example, within an instrument panel in the vehicle. When the road surface condition is transmitted from the transceiver 21, the meter display device visually notifies the driver of the road surface state by performing display in such a manner that the condition of the road surface can be grasped.

The notifier 22 may alternatively be configured with a buzzer or a voice guidance device. In such a case, the notifier 22 notifies the driver of the road surface state audibly by buzzer sound or voice guidance. Although the meter display device has been exemplified as the notifier 22 providing visual notification, the notifier 22 may be configured with a display device that displays information such as a head up display.

The road surface condition estimation apparatus 100 is configured as described above in the present embodiment. Each device forming the vehicle body side system 2 is connected through an in-vehicle LAN (Local Area Network) like CAN (Controller Area Network) communication. Therefore, each part can communicate information with each other through the in-vehicle LAN.

Figure 8:
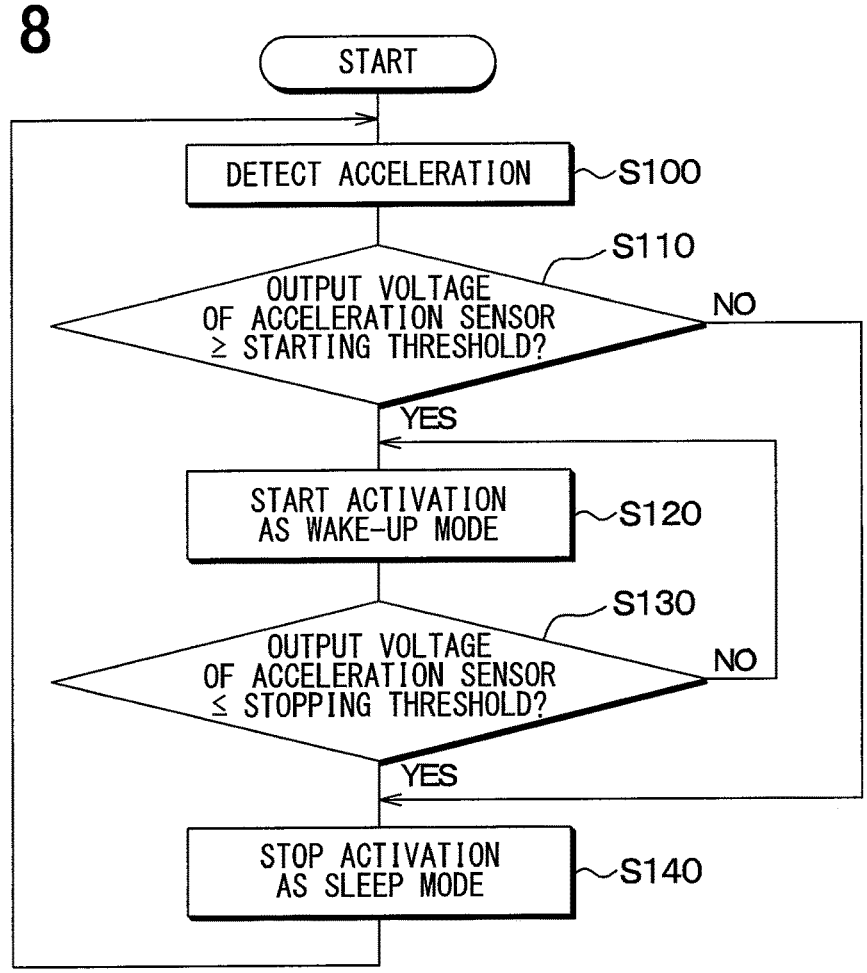
FIG. 8 is a flowchart showing an entire process executed systematically by the tire-mounted sensor.

An operation of the tire-mounted sensor 1 in the road surface condition estimation apparatus 100 will be described next. FIG. 8 is a flowchart showing an entire process executed systematically by the tire-mounted sensor 1.

With regard to the tire-mounted sensor 1 at each wheel of a vehicle, the acceleration sensor 11 executed acceleration detection based on the power supplied from the power supply 15 for generating an output voltage according to the vibration on the tire 3. As shown in step S110, the activation controller 16 determines whether the output voltage of the acceleration sensor 11 is larger than or equal to a predetermined starting threshold value. In other words, the activation controller 16 determines whether the output voltage of the acceleration sensor 11 is at a time where the first peak value is detected. With regard to the present embodiment, when the output voltage of the acceleration sensor 11 is larger than or equal to the reference voltage Vref of the comparator 160, determination is executed in this step. Subsequently, when the output voltage of the acceleration sensor 11 is larger than or equal to the predetermined starting threshold, the controller 13 is at the wakeup mode to be activated as shown in step S120.

As shown in step S130, the stopping controller 13d determines whether the output voltage of the acceleration sensor 11 is smaller than or equal to a predetermined stopping threshold value. In other words, the activation controller 16 determines whether the output voltage of the acceleration sensor 11 is at a time where the second peak value is detected. When the output voltage of the acceleration sensor 11 is equal to or smaller than the predetermined stopping threshold value, the controller 13 is switched to a sleep mode so as that the activation of the controller 13 is stopped as shown in step S140. It is noted that the controller 13 is maintained at the wakeup mode until affirmative decision is made at step S130.

By repeating the above-mentioned operation, the controller 13 is activated only in a period from a moment of detecting the first peak value to a moment of detecting the second peak value. Each of the first peak value and the second peak value is the output voltage of the acceleration sensor 11 used for estimate the road surface condition.

As described above, the road surface estimation apparatus 100 according to the present embodiment is configured to activate the controller when the output voltage of the acceleration sensor 11 is at the first peak value. Therefore, the activation time for the controller 13 may be shortened.

More specifically, the controller 13 is activated at the time where the output voltage of the acceleration sensor 11 is at the first peak value. The controller is stopped at the time where the output voltage of the acceleration sensor 11 is at the second peak value. The controller 13 stops the activation in a period from a moment of detecting the second peak value until a moment of detecting the first peak value. Thus, it is possible to shorten the activation time for the controller 13 so as to reduce power consumption. Accordingly, when a button cell is used as the power supply 15, it is possible to improve the battery's lifespan. When a power generation device is used as the power supply 15, it is possible to obtain enough power to detect the road surface condition even if the amount of power supplied from the power generation device is smaller.

Second Embodiment

The following describes a second embodiment. The present embodiment is different from the first embodiment in the configuration of the activation controller 16, and the other parts are similar to the first embodiment, so only the difference from the first embodiment will be described.

Figure 9:
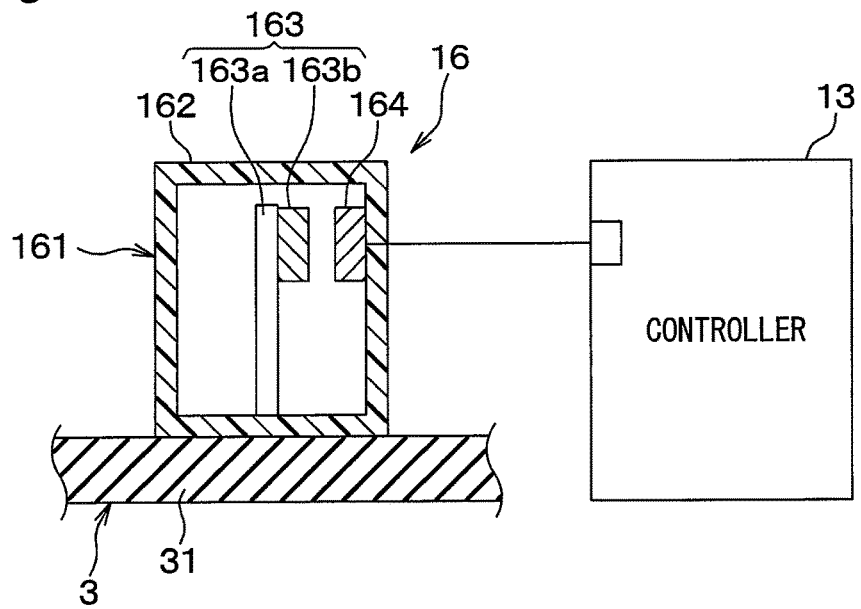
FIG. 9 is a drawing that illustrates the particular configuration of an activation controller described in a second embodiment.

According to the present embodiment, the activation controller 16 is configured by a mechanical switch 161 as shown in FIG. 9. In particular, the activation controller 16 includes a package 162, a movable part 163 having a beam 163a and a movable contact 163b, and a stationary contact 164.

The package 162 is provided with a hollow casing. The package 162 has a rear surface, an upper surface and a side wall. The rear surface of the package 162 is stick at the rear surface of the tread 31 of the tire 3 so that the activation controller 16 is attached to the tire 3.

With regard to the movable part 163, one end of the beam 163a is fixed to the rear surface of the package 162, and the other end of the beam 163b is attached with the movable contact 163b. The beam 163a is deflected with the vibration in the tire's tangential direction so that the movable contact 163b can be moved. The stationary contact 164 is provided at a position of the inner wall surface of the package 162 corresponding to the movable contact 163b. The movable contact 163 is moved by the deflection of the beam 163a, and the movable contact 163b is in contact with the stationary contact 164 so that the mechanical switch 161 is turned on.

The amount of deflection of the beam 163a is set to be corresponded to the amplitude of vibration in the tire's tangential direction. When the vibration, which corresponds to the time of the start of ground contact as the output voltage of the acceleration sensor 11 is at the first peak value, the movable contact 163a is brought to be in contact with the stationary contact 164 so that the amount of deflection of the beam 163a.

With the use of such activation controller 16, the movable contact 163b is brought into contact with the stationary contact 64 to turn on the mechanical switch at the time of the start of ground contact; the controller 13 is activated when the mechanical switch is turned on. Even with such a structure for the activation controller 16, the same effect as in the first embodiment can be obtained.

Third Embodiment

A third embodiment will be described. The present embodiment is different from the first embodiment in the configuration of the activation controller 16, and the other parts are similar to the first embodiment, so only the difference from the first embodiment will be described.

In the present embodiment, the activation controller 16 is incorporated into the controller 13, and the output voltage of the acceleration sensor 11 is input to the activation controller 16. The output voltage of the acceleration sensor 11 is input to the activation controller 16 as the activation voltage. When the output voltage of the acceleration sensor 11 exceeds the starting threshold value corresponding to the first peak value, the controller 13 is activated.

Even with the activation controller 16 to be incorporated into the controller 13, the same effect as in the first embodiment can be obtained.

Fourth Embodiment

A fourth embodiment will be described. The present embodiment is different from the first, second and third embodiments in modifying the activation starting time or the activation ending time for the controller 13, and the other parts are similar to the first embodiment, so only the difference from the first, second and third embodiments will be described.

With regard to the first, second and third embodiments, a starting moment of ground contact is regarded as the start time of activating the controller 13; and an ending moment of ground contact is regarded as the end time of activating the controller 13. However, the above-mentioned times are merely one of examples. The activation starting time or the activation stop time may be set in association with a starting moment of ground contact or an ending moment of ground contact.

More specifically, in the present embodiment, the activation starting time for the controller 13 may be set with a time period delay after the start of ground contact is detected; and the activation ending time for the controller 13 may be set with a time period delay after the end of ground contact is detected.

Figure 10:
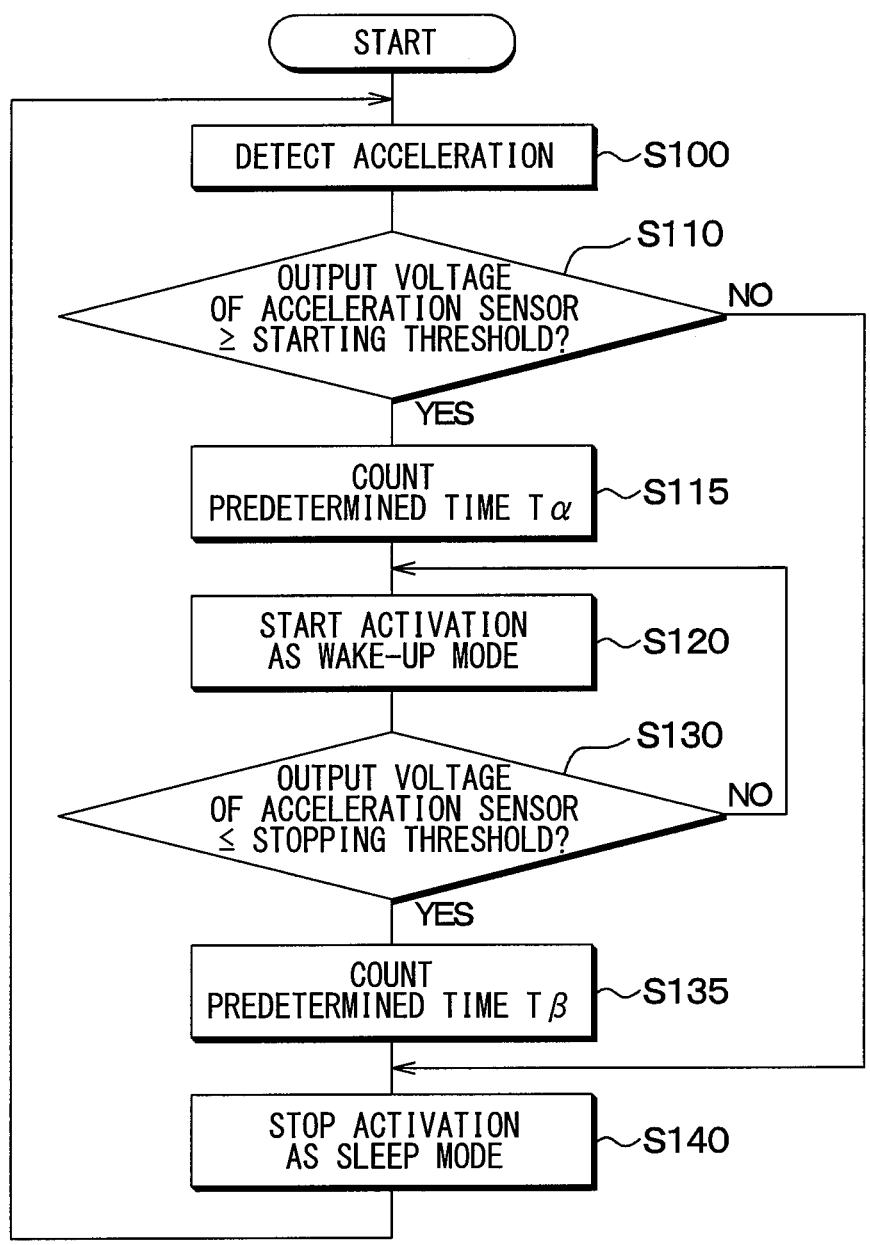
FIG. 10 is a flowchart showing an entire process executed systematically by the tire-mounted sensor as described in a fourth embodiment.

For example, the activation controller 16 or the controller 13 includes a timer (not shown). As shown in FIG. 10, the road surface condition estimation apparatus according to the present embodiment also executes steps S100 to S140 as illustrated in FIG. 8. Additionally, the apparatus according to the present embodiment executes steps S115 and S135.

In particular, affirmative decision is made in step S110 and the process is shifted to step S115. When the counter of the timer (not shown) reaches a predetermined time Tα, the controller 13 is shifted to the wakeup mode at step S120. Similarly, affirmative decision is made at step S130 and the process is shifted to step S135. When the counter of the time (not shown) reaches a predetermined time Tβ, the controller 13 is shifted to the sleep mode at step S140.

As described above, the activation starting time for the controller 13 may be set with a time period delay after the start of ground contact is detected; and the activation ending time for the controller 13 may be set with a time period delay after the ground contact ending time is detected. The detection signal of the acceleration sensor 11 in at least one part of the whole period of the ground contact is used for estimating road surface condition. The effects similar to the ones in the first, second and third embodiments may also be attained. Since the activation of the controller is still executed in a time period after the ground contact section. It may also be preferable to use vibration data subsequent to detecting the second peak value of the output voltage of the acceleration sensor 11.

The predetermined time Tα and the predetermined time Tβ described herein are distinct to each other. Therefore, both of Tα and Tβ may have the same length of time, or both of Tα and Tβ may have different lengths of time. With regard to the predetermined time Tα or Tβ, it may be set as a preliminary set value or a variable value. For example, it is possible to determine the vehicle speed at which the road surface condition estimation is to be executed in advance, and to set the vehicle speed as the prescribed value based on the time period of the presumed ground contact section. The rotational speed of the tire 3, that is, the vehicle speed is estimated based on the detection signal of the acceleration sensor 11. It is possible to estimate the time period of the ground contact section so that the vehicle speed is set as the prescribed value based on the time period of the presumed ground contact section. The predetermined time Tα refers to a time period shorter than the time period of ground contact section and a time period for the detection signal of the acceleration sensor 11 to be sent to the controller 13 to execute the road surface condition estimation. The predetermined time Tβ is not particularly limited. It is preferable to be set the predetermined time Tβ short in view of reducing power consumption.

Fifth Embodiment

A fifth embodiment will be described. The present embodiment is different from the first, second, third and fourth embodiments in modifying the activation starting time or the activation ending time for the controller 13, and the other parts are similar to the first embodiment, so only the difference from the first, second, third and fourth embodiments will be described.

Figure 11:
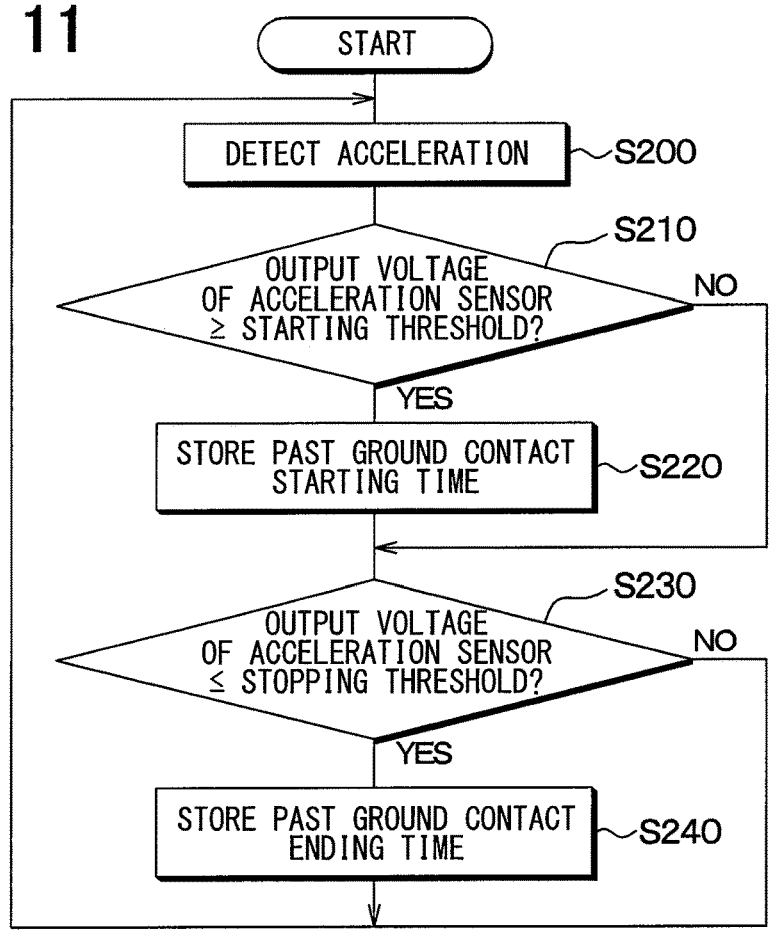
FIG. 11 is a flowchart showing a storage process at the ground contact starting time and the ground contact ending time executed systematically by a tire-mounted sensor as described in a fifth embodiment.
Figure 12:
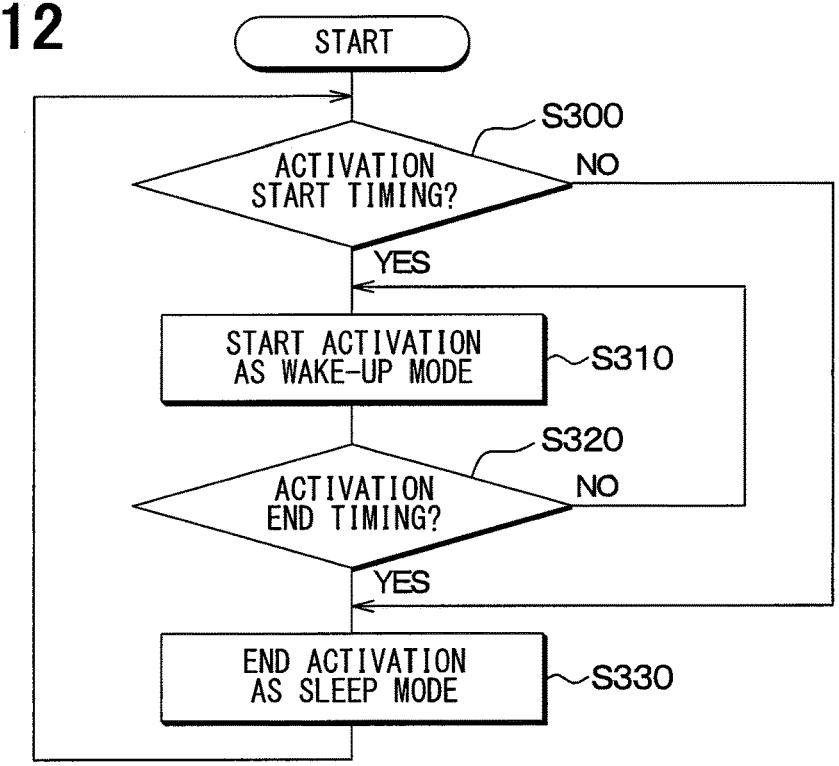
FIG. 12 is a flowchart showing a control process at the start of activation and the end of the activation.

In the present embodiment, activation starting time or the activation ending time is set based on the detection signal of the acceleration sensor 11 based on the past rotation (herein, the previous rotation) of the tire 3. The present embodiment will be described with reference to FIG. 11 and FIG. 12. FIG. 11 is a flowchart showing a process for storing the data at the starting time of ground contact and at the ending time of ground contact. FIG. 12 is a flowchart showing a control process for the start of activating the controller 13 and the end of activating the controller 13. Each process is executed independently with each predetermined control cycle. For example, a single process is executed in each rotation of the tire 3.

With regard to the tire-mounted sensor 1 at each wheel of a vehicle, the acceleration sensor 11 executed acceleration detection based on the power supplied from the power supply 14 for generating an output voltage according to the vibration on the tire 3, as illustrated in step S200 of FIG. 11. As shown in step S210, the activation controller 16 determines whether the output voltage of the acceleration sensor 11 is larger than or equal to a predetermined starting threshold value. In other words, the activation controller 16 determines whether the output voltage of the acceleration sensor 11 is at a time where the first peak value is detected. When affirmative determination is made in step S210, the process is shifted to step S220. The time at which the output voltage of the acceleration sensor 11 is at the first peak value is stored as the past ground contact starting time. Herein, the past ground contact starting time refers to the ground contact starting time in the previous rotation of the tire 3. The activation controller 16 includes a memory (not shown). The memory may store the ground contact starting time. As described hereinafter, it may be preferable to store the ground contact starting time when the controller 13 has already been activated.

As shown in step S230, the stopping controller 13d determines whether the output voltage of the acceleration sensor 11 is smaller than or equal to a predetermined stopping threshold value. In other words, it is determined whether the output voltage of the acceleration sensor 11 is at a time where the second peak value is detected. When the output voltage of the acceleration sensor 11 is smaller than or equal to the predetermined stopping threshold value, the process is shifted to step S240. The time at which the output voltage of the acceleration sensor 11 is at the second peak value is stored as the past ground contact ending time. The past ground contact ending time refers to the ground contact ending time in the previous rotation of the tire 3. The controller 13 includes a memory (not shown). The memory is configured to store the ground contact ending time.

As described above, the tire-mounted sensor 1 includes a storage device such as a memory, which stores the past ground contact starting time or the past ground contact ending time.

The control process for starting activation and ending activation as shown in FIG. 12 is executed based on the content stored by the storing process at the ground contact starting time and the ground contact ending time as shown in FIG. 11. As shown in step S300 in FIG. 12, it is detected that the activation starting time has arrived. In particular, the time required for one rotation of the tire 3 is calculated during the activation of the controller in the previous rotation of the tire 3. When the time required for one rotation of the tire 3 is added to the ground contact starting time stored in step S220, the ground contact starting time in the current rotation of the tire 3 can be calculated. Accordingly, in association with the ground contact starting time at the current rotation of the tire 3 being calculated, the ground contact starting time is set as the activation starting time. An advanced time which is earlier than the ground contact starting time with a predetermined time or a delay time which is later than the ground contact starting time is set as the activation starting time. When the activation starting time has arrived, the process is shifted to step S310, and the controller 13 is automatically switched to the wakeup mode.

Subsequently, the process is shifted to step S320, and it is detected that the activation ending time has arrived. In particular, when the time required for one rotation of tire 3 is calculated during the activation of the controller 13 in the previous rotation of the tire 3, the ground contact ending time at the current rotation of the tire 3 can be calculated by adding the time required for one rotation of the tire 3 to the ground contact ending time stored in step S240. Accordingly, in association with the ground contact ending time at the current rotation of the tire 3 being calculated, the ground contact ending time is set as the activation ending time. An advanced time which is earlier than the ground contact ending time with a predetermined time or a delay time which is later than the ground contact ending time is set as the activation ending time. When the activation ending time has arrived, the process is shifted to step S330, and the controller 13 is automatically switched to the sleep mode.

In a situation where the tire 3 stops to rotate, the time required for one rotation of the tire is calculated as infinity. The subsequent activation starting time or the subsequent activation ending time may not be set, or may be set after the infinite time. Accordingly, regardless of whether the tire 3 stops or not, the start of activating the controller 13 or the end of activating the controller 13 is not executed.

Herein, the activation starting time or the activation ending time may be set arbitrarily in association with the ground contact starting time or the ground contact starting time, respectively. However, it may be preferable to set the activation starting time at a time, which is earlier than the ground contact starting time stored in step S220 with a length of time. It may also be preferable to set the activation ending time at a time, which is later than the ground contact ending time stored in step S240 with a length of time. As described above, the time period where the ground contact section is formed during the current rotation of the tire 3 may be included in the time period where the controller 13 is in activation. When the controller 13 is in activation, the controller 13 may store the data at the ground contact starting time in step S220 or store the data at the ground contact ending time in step S240. However, the data may be stored in the memory (not shown) included in the activation controller 16.

As described above, the activation starting time or the activation ending time may be set based on the detection signal of the acceleration sensor 11 generated in the past rotation of the tire 3, for example, the previous rotation of the tire 3. Even with such a configuration, the same effect as in the first, second, third and fourth embodiments can be obtained. Since the activation of the controller 13 is already executed in a time period before the formation of the ground contact section. It may also be preferable to use vibration data subsequent to detecting the first peak value of the output voltage of the acceleration sensor 11.

In a situation where the activation of the controller 13 is started as described in the present embodiment, when the controller 13 has not yet been activated after the tire 3 starts to rotate, the controller 13 is not activated based on the information in the previous rotation since the ground contact starting time or the ground contact ending time is not stored in the previous rotation. When the tire 3 starts to rotate and the controller 13 is initially activated, the controller 13 may be activated by, for example, the method described in the first embodiment.

As shown in the third embodiment, the activation controller 16 is incorporated inside the controller 13; the activation controller 16 does not include the memory. The ground contact starting time may be stored in the memory included in the controller 13. For example, when the output voltage of the acceleration sensor 11 to be input to the activation controller 16 is larger than or equal to the starting threshold value corresponding to the first peak value, the output voltage may be stored as the ground contact starting time into the memory inside the controller 13.

As described in the second embodiment, the activation controller 16 is configured by the mechanical switch 161. In this situation, the time at which the mechanical switch 161 is turned on is stored as the ground contact starting time in the controller 13, the activation starting time may be set for the controller 13 in association with the ground contact starting time.

Other Embodiments

Although the present disclosure is described based on the above embodiments, the present disclosure is not limited to the embodiments. Various changes and modifications may be made in the present disclosure. Furthermore, various combination and formation, and other combination and formation including one, more than one or less than one element may be made within the spirit and scope of the present disclosure.

For example, in the embodiments described above, the ground contact section is specified from the detection signal of the acceleration sensor 11 forming the vibration detector and the calculation result of the level of the high frequency components in the detection signal in the ground contact section is used as the road surface data. However, this is only one example of a method of detecting the road surface condition using the detection signal of the vibration detector. The road surface condition may be detected by any other methods which use the detection signal of the vibration detector. Although the vibration detector is formed exemplarily of the acceleration sensor 11, the vibration detector may be configured by any other vibration detection elements, for example, a piezoelectric element or the like. In addition, the power supply 15 is not limited to a battery but may be configured of a power generating device or the like. For example, in case of a vibration detector, it may be used to form not only the vibration detector but also the power supply 15.

With regard to the above-mentioned embodiment, the road surface data indicates µ data or road surface condition, in particular, the type of road surface. However, the data indicates road surface condition is also acceptable. In addition, the data indicating the first peak value to the second peak value of the voltage waveform output from the vibration detector may also be utilized.

With regard to the above-mentioned embodiment, the receiver 21 acts as a controller to receive the road surface data and notify of the road surface condition to the notifier 22. However, these are only examples, and a controller may be provided separately from the receiver 21, or another ECU such as the engine ECU or the brake ECU may function as the controller.

With regard to the above embodiment, the controller 13 includes the stopping controller 13d. When the output voltage of the acceleration sensor 11 is smaller than or equal to the predetermined stopping threshold value, the stopping controller 13d stops the controller 13, which is in the activation mode. However, the activation controller 16 may also stop the controller 13 in the activation mode when it is detected that the output voltage of the acceleration sensor 11 is smaller than or equal to the predetermined stopping threshold value.

With regard to each of the embodiments, the activation starting time or the activation ending time may be set at a time in association with the ground contact starting time and the ground contact ending time, respectively. The activation starting time or the activation ending time described herein may be respectively set at a time based on the ground contact starting time or the ground contact ending time. The activation starting time or the activation stop time may be respectively set at a time based on not only the ground contact starting time or ground contact ending time, but also based on the time period before and after the ground contact starting time or the time period before and after the ground contact ending time The activation starting time or the activation stop time may be set to include an unintentional time delay caused by the process executed by the controller 13.

The invention claimed is:

1. A tire-mounted sensor mounted to a rear surface of a tread of a tire, the tire-mounted sensor comprising:
   a vibration detector configured to output a detection signal according to amplitude of a vibration of the tire;
   a signal processor that is configured to
      extract a ground contact section, which refers to a time period during which the portion of the tread provided with the vibration sensor is in contact with the ground, from the detection signal, and
      generate a road surface data, which indicates a road surface condition based on the detection signal during the ground contact section;
   a transmitter configured to transmit the road surface data; and
   an activation controller configured to start an activation of the signal processor,
   wherein the activation controller starts the activation of the signal processor at a time, which is in association with a ground contact starting time at which the portion of the tread provided with the vibration detector begins to be in contact with the ground.

2. The tire-mounted sensor according to claim 1, wherein:
   the activation controller starts the activation of the signal processor at an activation starting time,
   the activation starting time is either within a predetermined time period prior to the ground contact starting time or within a predetermined time period subsequent to the ground contact starting time.

3. The tire-mounted sensor according to claim 1, wherein:
   the activation controller starts the activation of the signal processor at a time in association with the ground contact starting time; and
   the ground contact starting time occurs in response to a value of an output voltage, which indicates the detection signal of the vibration detector, being larger than or equal to a predetermined starting threshold value.

4. The tire-mounted sensor according to claim 1,
wherein the activation controller is further to configured to
- store a time as the ground contact starting time when a value of an output voltage, which indicates the detection signal of the vibration detector, is larger than or equal to a predetermined starting threshold value,
- set the activation starting time in association with the ground contact starting time in the signal processor, and
- start the activation of the signal processor at the activation starting time.

5. The tire-mounted sensor according to claim 3, wherein the activation controller includes a comparator configured to compare the value of the output voltage, which indicates the detection signal output from the vibration detector, with a value of a reference voltage corresponding to the predetermined starting threshold value.

6. The tire-mounted sensor according to claim 3, wherein:
the activation controller includes a mechanical switch having a movable part and a stationary contact;
the movable part has
- a beam which is deflected according to the vibration of the tire in a tangential direction, and
- a movable contact provided at the beam configured to move according to the deflection of the beam;
the stationary contact is in contact with the movable contact, which is moved by the deflection of the beam caused by an acceleration at the ground contact starting time; and
the ground contact starting time refers to a moment where the mechanical switch is turned on.

7. The tire-mounted sensor according to claim 1, wherein:
the signal processor further includes a stopping controller; and
the stopping controller is configured to stop the activation of the signal processor at a time in association with a ground contact ending time based on an output voltage, which indicates the detection signal output from the vibration detector; and
the ground contact ending time refers to a time at which the portion of the tread provided with the vibration detector finishes off being in contact with the ground.

8. The tire-mounted sensor according to claim 7, wherein:
the signal processor is further configured to end the activation of the signal processor at an activation ending time,
the activation ending time is either within a predetermined time period prior to the ground contact ending time or within a predetermined time period subsequent to the ground contact ending time.

9. The tire-mounted sensor according to claim 1, wherein:
the activation controller is further configured to stop the activation of the signal processor at a time in association with the ground contact ending time based on an output voltage, which indicates the detection signal output from the vibration detector; and
the ground contact ending time refers to a time at which the portion of the tread provided with the vibration detector finishes off being in contact with the ground.

10. The tire-mounted sensor according to claim 9, wherein the activation controller is further configured to end the activation of the signal processor at an activation ending time,
the activation ending time refers to a time either within a predetermined time period prior to the ground contact ending time or within a predetermined time period subsequent to the ground contact ending time.

11. A road surface condition estimation apparatus, comprising;
tire-mounted sensor according to claim 1; and
a vehicle body system at a vehicle body and having a controller,
wherein the controller is configured to receive the road surface data from the transmitter, and to estimate a road surface condition based on the road surface data.

* * * * *